United States Patent [19]

Butera et al.

[11] Patent Number: 5,262,858
[45] Date of Patent: Nov. 16, 1993

[54] METHOD OF CONVERTING THE CLOCK RATE OF A DIGITIZED SIGNAL

[75] Inventors: William Butera, Emmendingen; Herbert Alrutz, March, both of Fed. Rep. of Germany

[73] Assignee: Deutsche ITT Industries GmbH, Freiburg, Fed. Rep. of Germany

[21] Appl. No.: 796,566

[22] Filed: Nov. 21, 1991

[30] Foreign Application Priority Data

Dec. 5, 1990 [EP] European Pat. Off. ......... 90123312.2
May 24, 1991 [EP] European Pat. Off. ......... 91108409.3

[51] Int. Cl.⁵ .......................... H04N 7/13; H04N 7/01
[52] U.S. Cl. ..................................... 358/140; 358/133; 364/724.1
[58] Field of Search .................. 358/138, 140, 133, 11, 358/12, 141, 142; 364/724.01, 724.1, 725, 724.16–724.17

[56] References Cited

U.S. PATENT DOCUMENTS 4,612,573  9/1986  Grallert et al. ..................... 358/140
4,829,378  5/1989  LeGall ................................ 358/12
4,918,524  4/1990  Ansari et al. ....................... 358/138
5,097,331  3/1992  Chen et al. ......................... 358/138
5,128,760  7/1992  Chauvell ............................ 358/140

FOREIGN PATENT DOCUMENTS 0285902  10/1988  European Pat. Off. .
0413570   3/1991  European Pat. Off. .

Primary Examiner—Victor R. Kostak
Assistant Examiner—Glenton B. Burgess
Attorney, Agent, or Firm—Thomas L. Peterson

[57] ABSTRACT

One-dimensional or multi-dimensional digitized signals are transformed into one-dimensional or multi-dimensional output signals by clock-rate conversion of subband signals. To synthesize the output signal at least one continuous subset of primary subband signals is used. The subset includes the subband signal with the lowest frequency range. During reproduction of images which are horizontally and vertically scanned and digitized, absolute and relative format changes can be implemented by the clock-rate conversion.

18 Claims, 7 Drawing Sheets

FIG. 8a
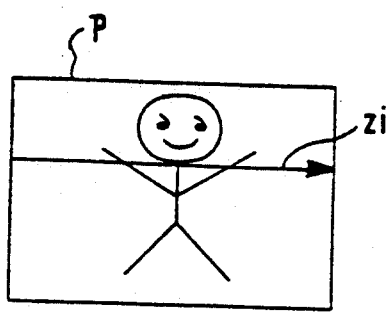
FIG. 8b
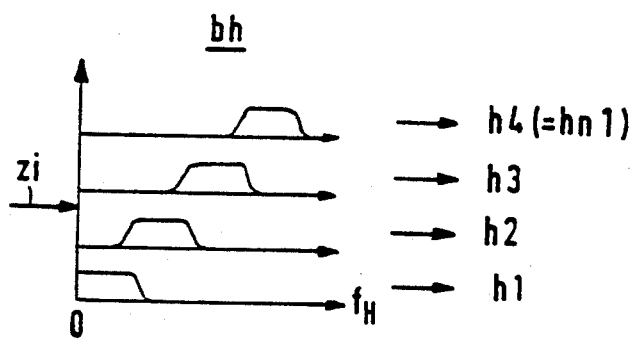
FIG. 8c
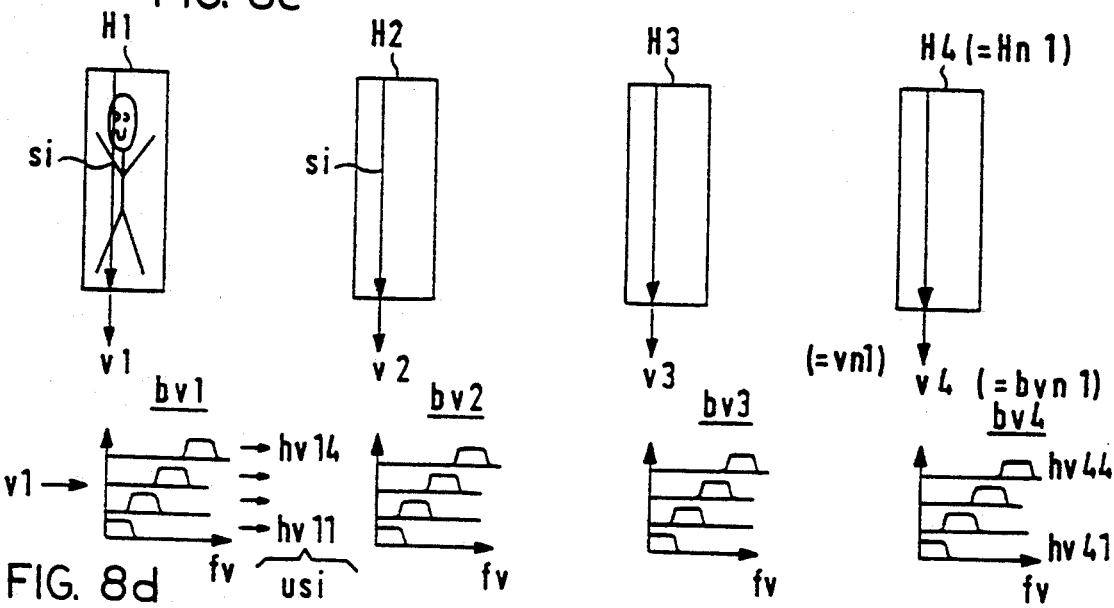
FIG. 8d
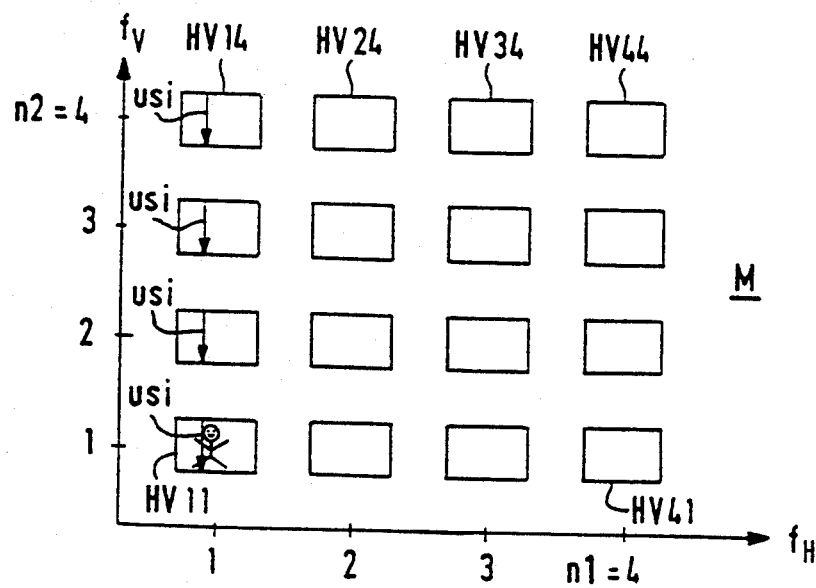
FIG. 8e

METHOD OF CONVERTING THE CLOCK RATE OF A DIGITIZED SIGNAL

BACKGROUND OF THE INVENTION

1. Field of the Invention

The present invention relates to a method of converting the clock rate of a digitized signal, with essential characteristics of the signal itself being influenced via the clock-rate conversion.

2. Description of the Related Art

The present invention uses signal decomposition into subbands. A subband-signal-processing technique is described, for example, in EP-A-A 413 570 for picture data compression. Subbands are component signals which are associated with individual frequency ranges and are derived from the signal by means of a filter bank. By means of an inverse filter bank, the desired output signal, which is to come as close to the original signal as possible, can then be reconstructed from the individual subbands, which are modified if necessary.

Subband decomposition has been known for a long time for analog signal processing, but it is now of interest for digital signal processing since, because of the accuracy and stability of the digital filters and the remaining digital signal-processing circuity, no spurious signals are generated which cause signal distortion during the subsequent reconstruction or synthesis of the output signal. This applies to one-dimensional signals, such as audio signals, and two-dimensional or multi-dimensional signals, such as television signals.

The superposition of the horizontal and vertical scanning of the elements of an image corresponds to a two-dimensional video signal. If the continuous image sequence is taken into account as a third scanning sequence, this corresponds to a conventional three-dimensional video signal, with the scanning rates for the three dimensions being very different.

SUMMARY OF THE INVENTION

The advantages of the clock-rate conversion in accordance with the invention lie, on the one hand, in the area of data storage or data transmission, particularly in the case of one-dimensional signals, and, on the other hand, in the raster-size change of multidimensional signals, particularly for adapting television signals of different standards to different reproduction devices, which may also have different video formats. This includes adaptation to different numbers of lines as well as up-conversion or down-conversion of television signals with different resolutions. This is of great advantage for the compatibility of high-definition television standards.

BRIEF DESCRIPTION OF THE DRAWINGS

The invention and further advantages thereof will now be explained in more detail with reference to the accompanying drawings, in which:

FIG. 8a to FIG. 8e show schematically how a primary matrix with 16 subband signals is formed from a primary image data field;

DETAILED DESCRIPTION OF THE PREFERRED EMBODIMENT

Figure 1:
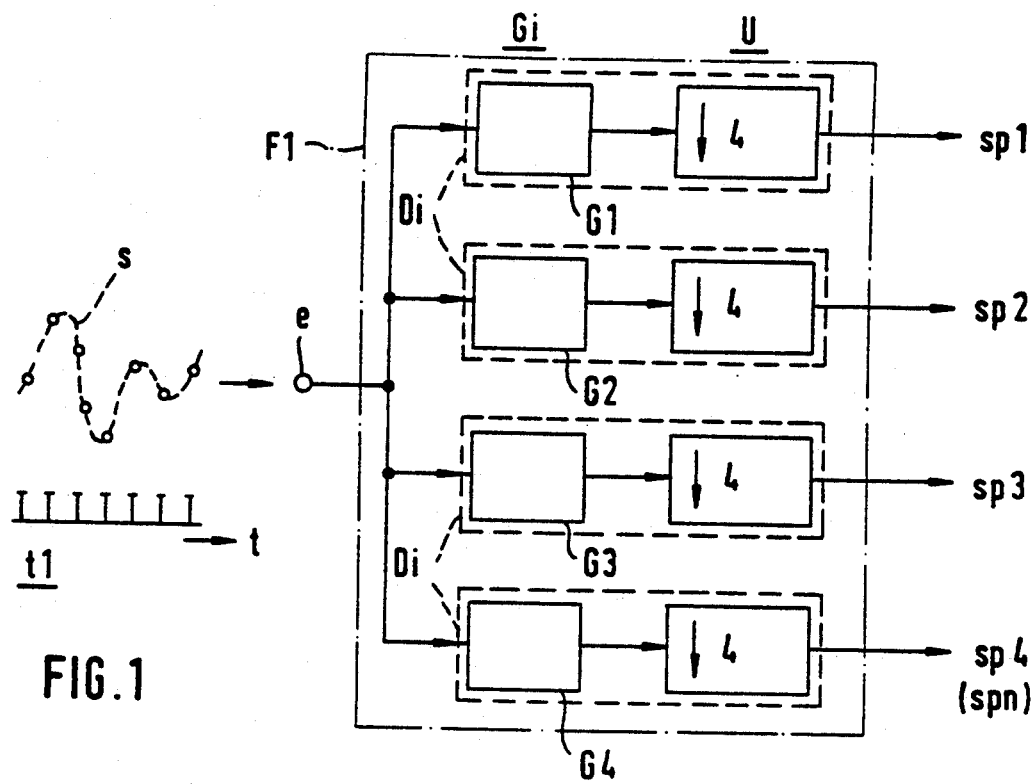
FIG. 1 and FIG. 2 show schematically the generation of subband signals from a one-dimensional signal.

FIG. 1 shows essentially the first filter device F1 for generating the n primary subband signals sp1 to spn (n=4 in the example shown). The first filter device F1 forms a filter bank whose input terminal e is supplied with a digital signal s digitized at a first clock rate t1. Each of the n filters of the filter bank is formed by a decimator $D_i$ comprising a decimation filter $G_i$ and a subsampling stage U. The decimation filters are bandpass filters which may be replaced in the lowest frequency range by a low-pass filter. The individual frequency ranges of the decimation filters adjoin each other and divide the total frequency range maxfs of the digital signal s into n subranges, as illustrated in the upper part of FIG. 2.

In the decimator $D_i$, each decimation filter $G_i$ is followed by a subsampling stage U which reduces the clock rate of the filtered signal by the factor n, i.e., by 4 in the example shown. This is possible without loss of information, since the decimation filter $G_i$ reduces the original signal bandwidth by the factor 1/n.

Figure 2:
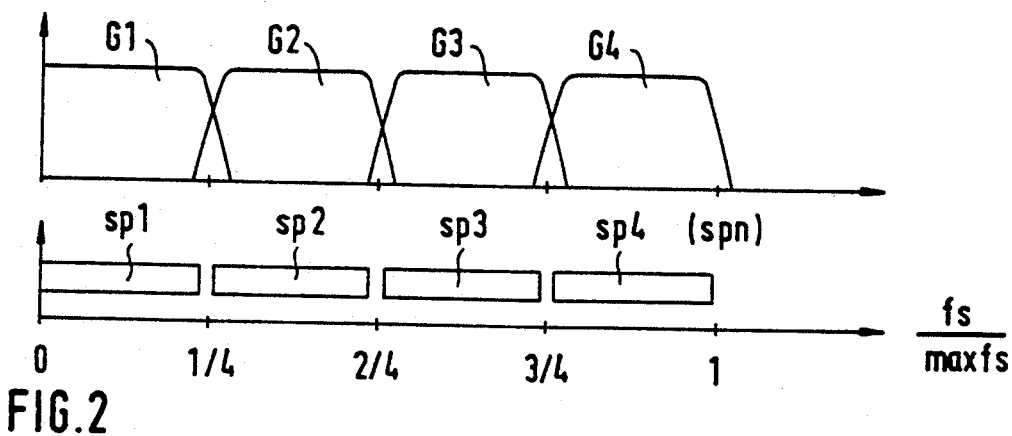

It should be pointed out that the sampling rate of the individual primary subband signals sp1 to sp4 is independent of the respective frequency range fs of these signals, as illustrated in the lower part of FIG. 2. A violation of the sampling theorem, particularly in the case of the highest-frequency subband sp4, does not occur because of the bandwidth limitation of the associated decimation filter G4 if the clock rate t1 of the digitized signal s is at least twice as high as the maximum frequency maxfs of this signal.

Figure 3:
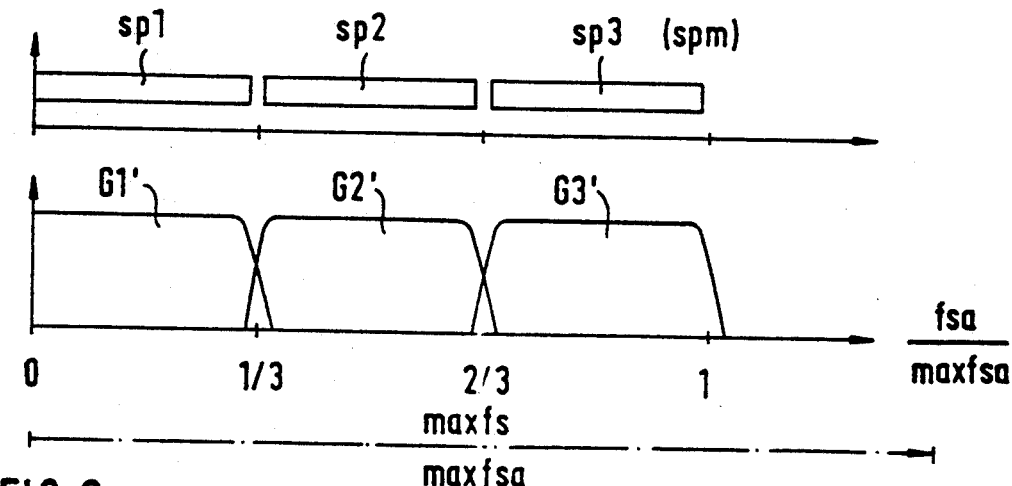
FIG. 3 and FIG. 4 show schematically the reconstruction of an output signal from an incomplete set of subband signals.
Figure 4:
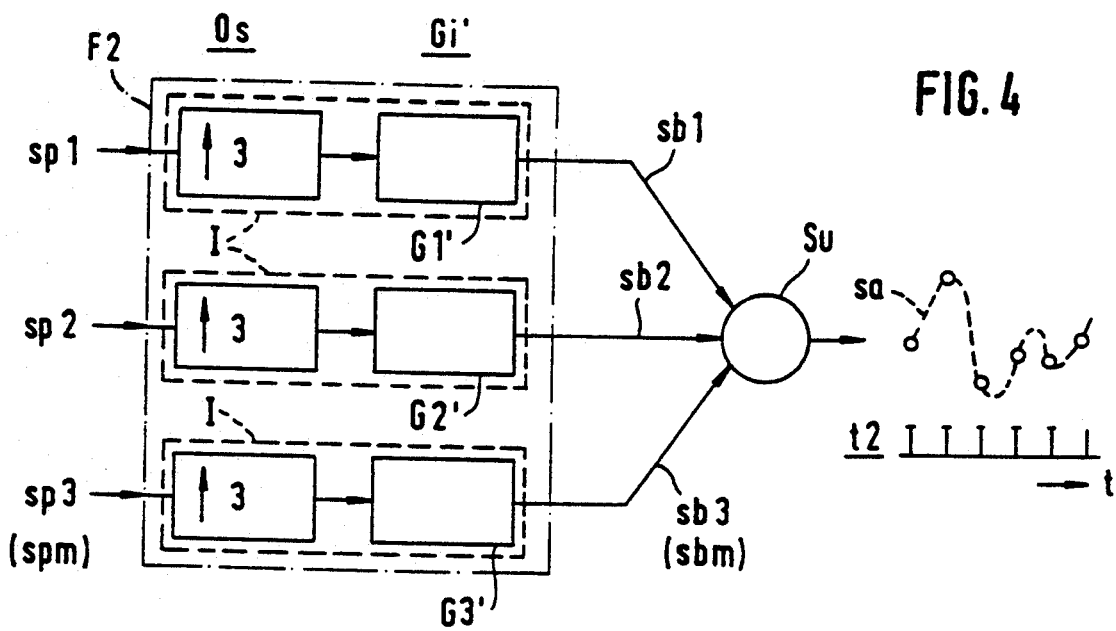

The decomposition of the digitized signal s into its primary subband signals sp1 to spn is also referred to as "analysis phase." The analysis phase is followed by the "synthesis phase," in which a digital output signal sa with the desired clock rate is derived from m secondary subband signals sp1 to spm by means of a second filter device F2, as illustrated in FIG. 3 and FIG. 4. The m secondary subband signals contain at least one continuous portion of the primary subband signals of the first filter device F1 arranged according to ascending frequencies, including the lowest frequency range. In FIG. 3 and FIG. 4, m is less than n.

Figure 5:
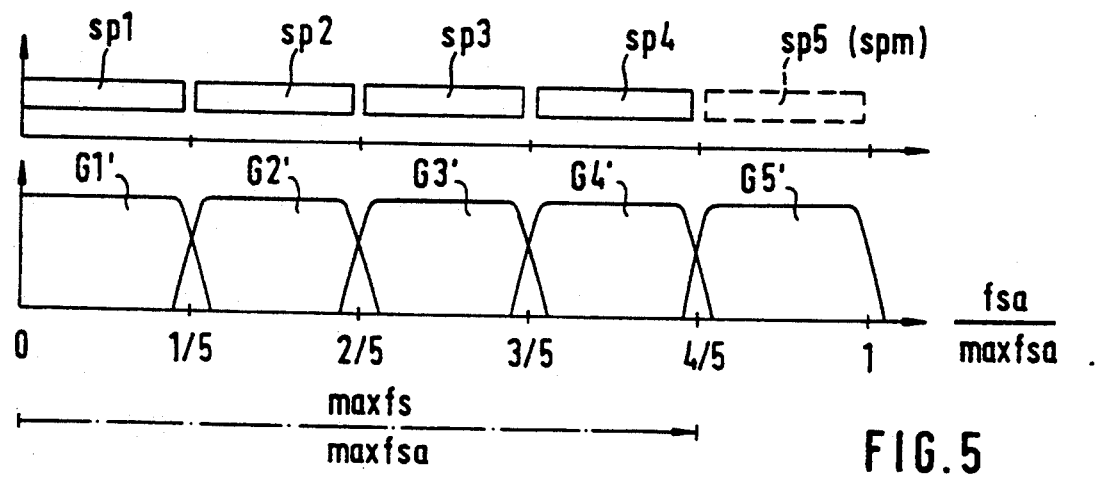
FIG. 5 and FIG. 6 show an example of the reconstruction of an output signal from an extrapolated set of subband signals.
Figure 6:
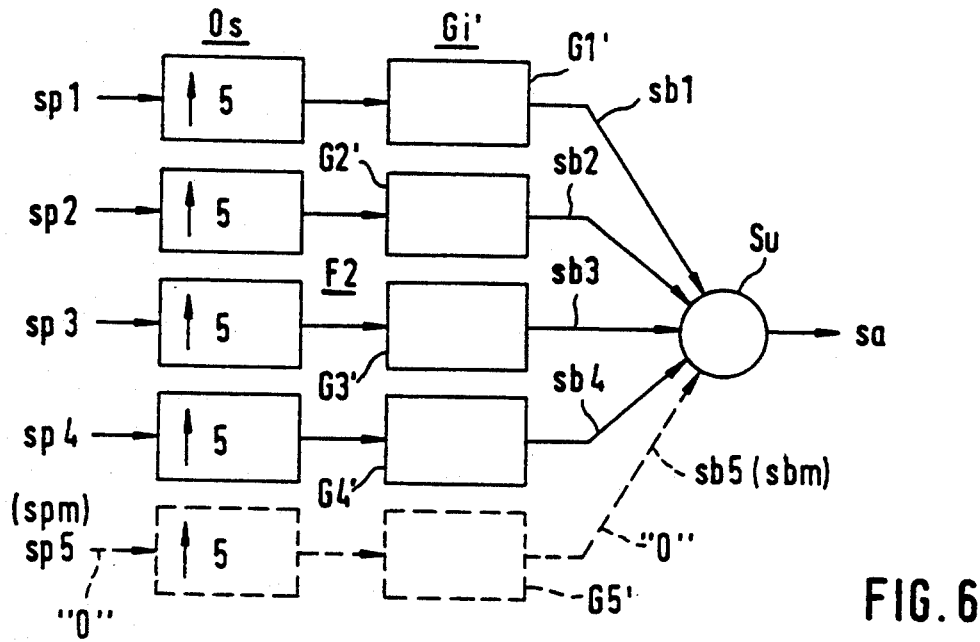

If m is greater than n, i.e., if no sufficient primary subband signals sp1 to spn are present, the missing primary subband signals are replaced by pseudosubband signals; as illustrated in FIG. 5 and FIG. 6, where the missing subband signal sp5 is indicated by dashed lines.

FIG. 3 shows a schematic frequency spectrum for the case where only the first three primary subband signals sp1, sp2, sp3 of the four subband signals of FIG. 1 and FIG. 2 are used. These three, however, are extended to the total frequency range maxfsa of the output signal sa. To this end, the frequency range maxfsa is divided into m=3 equal subranges which adjoin one another. The three frequency subranges are defined by the three interpolation filters G1′, G2′, G3′. The lowest frequency subrange is implemented by a bandpass or lowpass filter, and each of the two upper subranges by a bandpass filter.

FIG. 4 shows a block diagram of the circuit corresponding to FIG. 3, namely the second filter device F2 and a subsequent summing device Su which delivers the output signal sa with the desired second clock rate t2. The second filter device F2 is an inverse filter bank with m filters each of which is formed by an interpolator I comprising an oversampling stage Os and an interpolation filter Gi′. The interpolation filters Gi′ are designed as bandpass filters. In the lowest frequency subrange, the interpolation filter may be a low-pass filter. By means of the interpolators I, a sort of bandspreading is carried out for each secondary subband signal to fill up the respective passband of the interpolation filter Gi′. To this end, the clock rate of each of the n secondary subband signals sp1 to spm is increased by the factor m by means of an oversampling stage Os preceding the interpolation filter Gi′. The output of the second filter device F2 thus provides m modified subband signals sb1 to sbm (in the embodiment of FIG. 4, m=3) which are combined by the summing device Su into the output signal sa having the desired clock rate.

The reduction of the sampling rate by the factor n during the analysis phase and the increase of the sampling rate by the factor m during the synthesis phase result in a sampling rate ("second clock rate t2") of the output signal sa which differs from the first clock rate t1 by the factor m/n, where m and n are arbitrary, but integral factors.

FIGS. 5 and 6 show the synthesis phase with the associated circuit for the case where m is greater than n, starting from the analysis example of FIGS. 1 and 2. In the second filter device F2, m=5 secondary subband signals sp1 to sp5 ("spm") are processed, with only four primary subband signals sp1 to sp4 being available from the analysis phase. Consequently, the highest-frequency secondary subband signal sp5 must be replaced by a pseudosubband signal. The five frequency subranges of the second filter device F2 are formed by the five interpolation filters Gi′, which divide the total frequency range maxfsa of the output signal sa into five equal, adjoining subranges, as illustrated by the middle portion of FIG. 5.

FIG. 6 shows that each interpolation filter Gi′ is preceded by an oversampling stage Os in which the clock rate of the applied secondary subband signal is increased by the factor m (in the example, m=5).

The fifth filter section (dashed lines) of the second filter device F2 can be dispensed with if the digital value "0" is applied as the pseudosubband signal sb5. The output signal sb5 of this filter section will then always be "0," and will not appear in the subsequent summation of the modified subband signals sb1 to sb5.

An important application of the clock-rate conversion is in the transmission of signals via existing transmission services, which, as a rule, have transmission bandwidths that are not identical with the bandwidth of the signal to be transmitted, i.e., are greater or less. According to the invention, it is possible to divide the original subband set among several transmission services which are recombined at the receiving end without loss of information or signal distortion to reconstruct the original signal. In the case of unprotected transmission services, transmission quality can be improved by transmitting only those subbands via the unprotected transmission services which are of less importance for the reconstructed signal.

As the number of subbands to be synthesized is determined by the quality requirements on the synthesis side, it is not necessary at a low quality level to generate or transmit all subband signals on the analysis side. This is made possible, for example, by data compression, which has no disturbing effect on the reconstructed signal. The use of such data compression also permits more compact signal storage. Another application of the clock-rate conversion is in digital audio broadcasting, where an audio signal digitized at 48 kHz, for example, can be decomposed into a data stream of 32 subbands. This allows the channel bandwidth of the reconstructed audio signal to be adjusted in 1.5-kHz steps, for example.

Another, possibly even more important case of clock-rate conversion, relates to multidimensional video signals. Via a clock-rate conversion, the video format can be changed both absolutely and relative to the aspect ratio. The clock-rate conversion of multidimensional signals is based on the principle of the clock-rate conversion for one-dimensional signals as illustrated schematically in FIG. 7.

Figure 7:
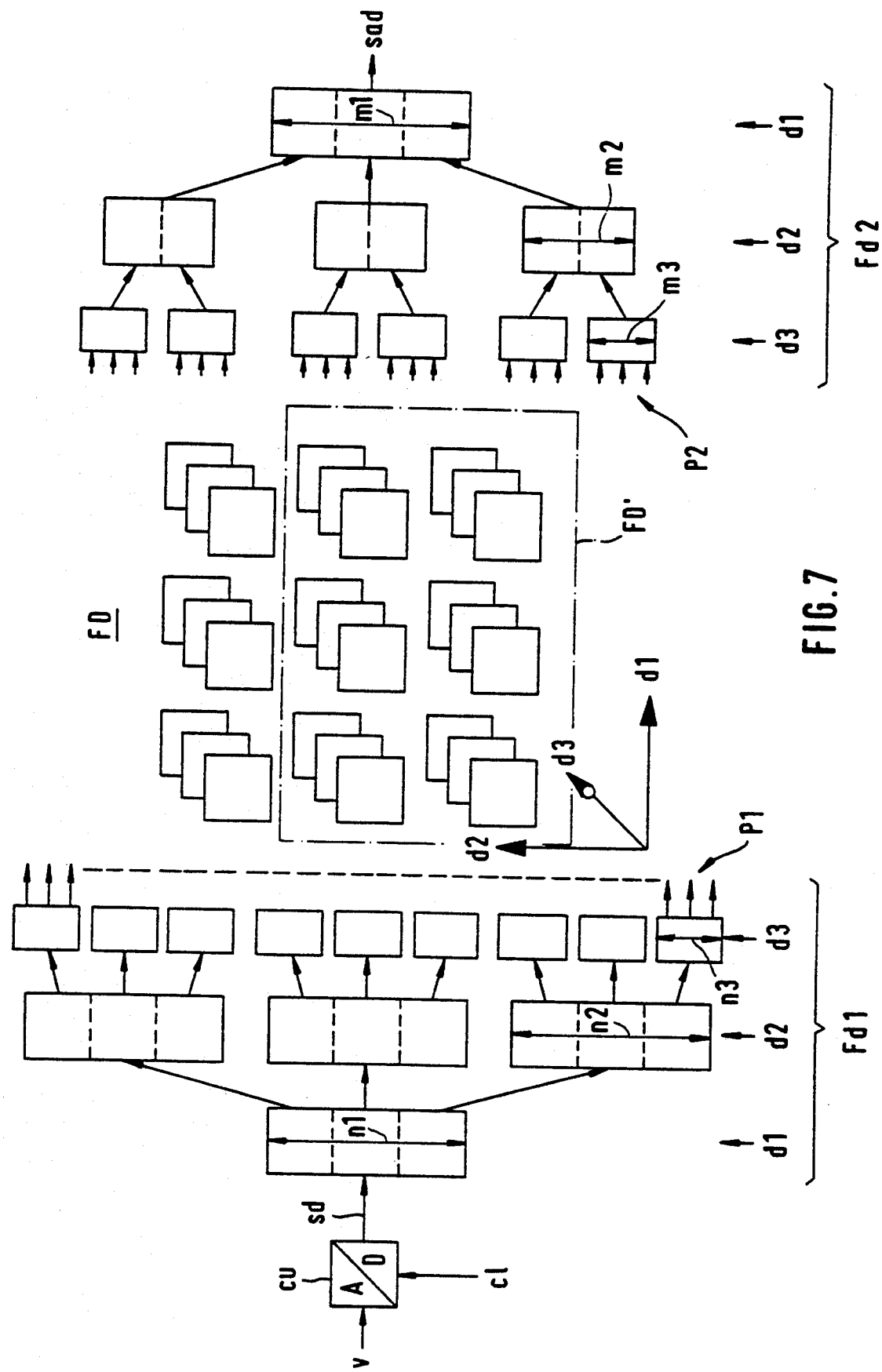
FIG. 7 shows schematically the method of converting the clock rate of a multidimensional signal.

In FIG. 7, an analog multidimensional signal v is digitized by means of an analog-to-digital converter cu, the digitization rate being determined by a system clock cl. The digitization yields a multidimensional digital signal sd, which is applied to the input of a first multidimensional filter device Fd1. In this filter device Fd1, the digital signal sd is decomposed into P1 primary subband signals which can be arranged according to ascending frequencies in the form of a multidimensional array ("subband matrix") FD with the dimensions di. The frequency ranges of the first multidimensional filter device Fd1 adjoin one another in the direction of each dimension. The number P1 of primary subband signals is determined by the product of the number ("ni") of frequency ranges associated with the individual dimensions di. As a numerical example, let di be 3, i.e., a three-dimensional signal is assumed which is to be decomposed into n1=5 frequency ranges in dimension d1, into n2=4 frequency ranges in dimension d2, and into n3=3 frequency ranges in dimension d3. This gives P1=n1×n2×n3=60 primary subband signals which can be arranged according to ascending frequencies in a three-dimensional matrix.

FIG. 7 shows schematically a subband matrix FD with P1=27 primary subband signals. Each of the three dimensions d1, d2, d3 is divided into three frequency ranges. By means of the first multidimensional filter device Fd1, the clock rate of the primary subband signals is reduced from the first clock rate ("system clock cl") by the factor P1.

During the synthesis phase, P2=18 secondary subband signals are fed to the secondary matrix FD′ of a second multidimensional filter device Fd2 whose frequency ranges adjoin one another in the respective dimensions d3, d2, d1. Analogously to the one-dimensional case, the total frequency range is divided into a given number of subranges in each dimension. As an example, it is assumed in FIG. 7 for the synthesis phase that the dimensions d1, d2 and d3 are divided into m1=3, m2=2, and m3=3 frequency subranges, respectively. Thus, on the synthesis side, the output signal sad is reconstructed from P2=m1×m2×m3=18 secondary subband signals. The P2 subband signals contain a continuous part of the primary subband signals of the first filter device Fd1 arranged according to ascending multidimensional frequency fields, starting from the lowest frequency subrange. The excess primary subband signals are not involved in the synthesis.

If sufficient primary subband signals are not present, i.e., if P2 is greater than P1, the missing subband signals are replaced by pseudosubband signals. In the simplest case, the value "0" is applied as a pseudosubband signal, as was described above for the one-dimensional case.

The second multidimensional filter device Fd2, like the one-dimensional arrangement, includes for each frequency subrange an interpolator consisting of an interpolation filter and an oversampling stage to increase the clock rates of the respective subband signals by the factor P2. The clock-rate conversion in the first and second multidimensional filter devices Fd1, Fd2 may be performed in one or more steps. This depends on the internal organization of the multidimensional filter device, the optimum solution being a cascade arrangement of the filter banks, which is illustrated by way of example in FIG. 7.

The analysis side in FIG. 7 is a three-stage cascade arrangement of filter banks, with each stage assigned to one of the dimensions d1, d2, d3. The first filter bank for the first dimension d1 has ni different frequency ranges. Connected to each of the n1 outputs is a second filter bank for the second dimension d2. Each of these second filter banks has n2 different frequency ranges. Each of these outputs—which thus total $n1 \times n2$—is coupled to a third filter bank for the third dimension d3 having n3 different frequency ranges. Each of these outputs—which thus total $P1 = n1 \times n2 \times n3$—provides one of the P1 primary subband signals. Since the clock rate is reduced in the first, second, and third filter banks by the factors n1, n2, and n3, respectively, it is possible under certain circumstances to drastically reduce the number of parallel filter banks by multiplex operation.

On the synthesis side, a corresponding, but reversed cascade arrangement is advantageous, with each dimension d1, d2, d3 assigned one set of inverse filter banks which increase the clock rates via interpolation filters and oversampling stages. The inverse filter banks also summate the individual signals.

FIG. 8a shows a primary image data field P which corresponds to the line-scanned and digitized primary image. Each data row zi corresponds to one scanning line. FIG. 8b shows how the sequence of individual data rows zi is applied to a horizontal filter bank bh. In the example shown, the total horizontal frequency range $f_H$ is divided into four ($n1 = 4$) equal frequency subranges which adjoin one another. The lowest frequency subrange forms a low-pass filter. The four output signals from the horizontal filter bank bh are the four h row signals h1 to h4 ("hn1"). The primary image data field P is thus decomposed by the four h line signals into $n1 = 4$ different H data fields H1 to H4 ("Hn1"). Since a decimation of the primary data rate is provided for each filter of the horizontal filter bank, the volume of data of each H data field in the horizontal direction is only one-quarter the original data volume of the data row zi. The data volume in the vertical direction of the H data fields is equal to that of the primary image data field P, however. In FIG. 8c, the data volumes of the H data fields are shown schematically by rectangles—the figure shown symbolizes the unilateral compression of the picture content.

Readout of the columns si of these four H data fields H1 to H4 takes place at the line-scanning rate of the primary image and provides the $n1 = 4$ column signals v1 to v4 ("vn1"). Associated with each H data field is a vertical filter bank bv1 to bv4 ("bvni"), which is shown schematically in FIG. 8d. Each of the four vertical filter banks comprises $n2 = 4$ filters—the total vertical frequency range $f_V$ of the primary image is thus divided into $n2 = 4$ equal subranges which adjoin one another. The outputs from these four filters form the hv column signals hv11, ..., hv44 ("hvn1n2"). Each of the filters of the vertical filter banks includes a decimator, so that the data rate of the hv column signals is reduced from the original line-scanning rate by the factor 1/P1, where $P1 = n1 \times n2$. The data volume of the HV data field formed from each hv column signal is reduced from that of the H data field by the factor 1/P1. This is shown schematically in FIG. 8 by a corresponding reduction of the size of the HV data fields HV11, ..., HV44 ("HVn1n2") and by the figure. The filter with the lowest pass frequency in each vertical filter bank is designed as a low-pass filter.

FIG. 8e shows a primary matrix M formed from the individual HV data fields, which are arranged in the horizontal and vertical directions according to ascending horizontal and vertical frequency ranges, respectively. For the example shown, in which both the horizontal frequency range $f_H$ and the vertical frequency range $f_V$ are divided into four subranges, a primary matrix M consisting of $P1 = 16$ HV data fields is obtained. As a result of the double decimation, the total data volume of the primary matrix M is equal to the data volume of the primary image data field P. Each of the HV data fields represents a given frequency range of the primary image data field P in the horizontal and vertical directions. The HV data field HV11 covers the lowest frequency range with a steady component in the horizontal and vertical directions. The HV data field HV44 covers the highest frequency range in both directions.

The primary matrix M includes the whole content of the primary image divided into frequency ranges. It is readily apparent that the Hv data fields with a high-frequency component are, as a rule, less important for picture reproduction than the HV data fields with a low-frequency component.

Figure 9A:
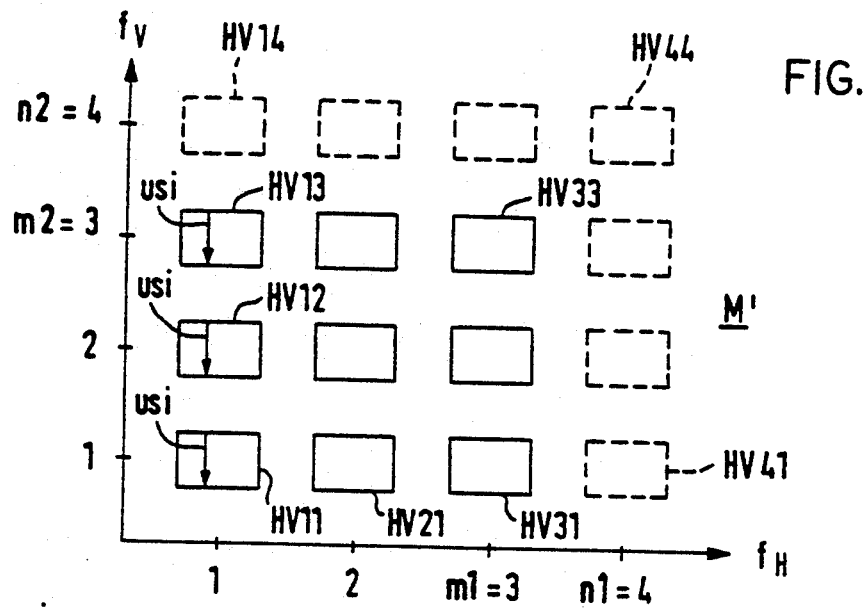
FIG. 9a to FIG. 9e show schematically how an image with a changed format is formed from parts of the primary matrix.

FIG. 9a shows a secondary matrix M', which is formed from the primary matrix M of FIG. 8e. All seven HV data fields with $n1 = 4$ or $n2 = 4$ (dashed lines) are omitted, so that the secondary matrix M' includes only the original HV data fields n1 from 1 to 3 and n2 from 1 to 3. The hv column signals usi of these nine HV data fields, which belong together, are applied to $m1 = 3$ inverse vertical filter banks bv1', bv2' and bv3' ("bvm1'"). The hv column signals usi with identical horizontal frequency ranges are applied to the same inverse vertical filter bank. The individual hv column signals are assigned to the inputs of the filters according to ascending frequencies.

Figure 9B:
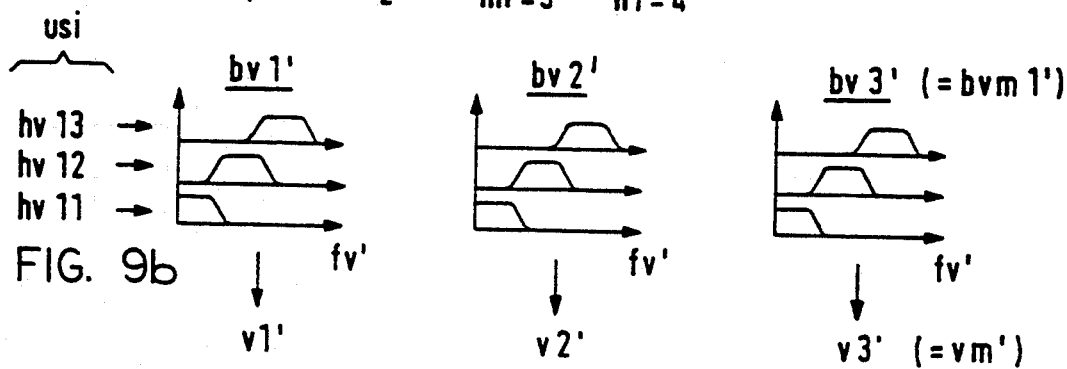
Figure 9C:
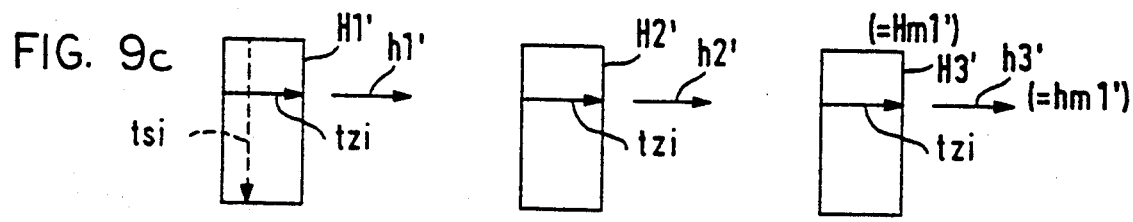

FIG. 9b shows schematically how a single vertical column signal (v1', v2', v3' ("vm1'")) is formed from three hv column signals usi of each of the HV data fields by means of an inverse vertical filter bank. Each inverse vertical filter bank includes $m2 = 3$ filters which divide the total vertical frequency range f' of the secondary-image-reproducing device bs into three equal adjoining subranges, the lowest frequency subrange being implemented with a low-pass filter. Each filter of the inverse vertical filter bank includes an interpolation filter and an oversampling stage with the oversampling factor m2, so that the sampling and data rate of the vertical column signal v1', v2', v3' is greater than that of the hv column signals usi of the individual HV data field by a factor of m2=3. This is shown schematically in FIG. 9c by the format and size of the secondary H data fields H1', H2', H3' ("Hm1'"). The vertical column signals form the columns tsi of the three secondary H data fields H1', H2', H3' ("Hm1'"), which, as data, form the rows tzi in the horizontal direction. The h row signals h1', h2', h3' are formed from the data of the rows tzi.

Figure 9D:
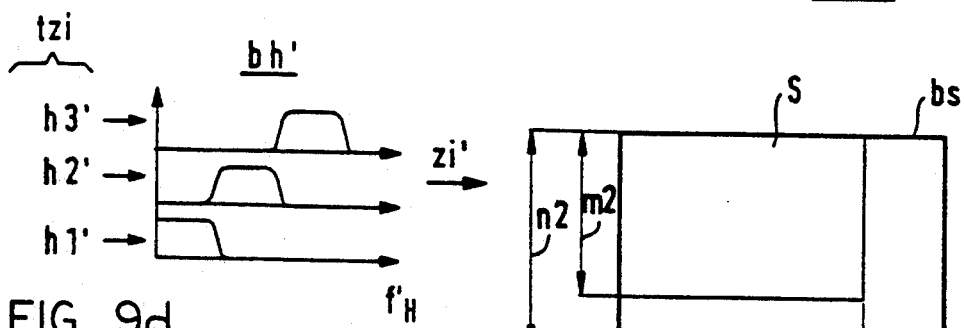

The inverse vertical filtering is followed by inverse horizontal filtering, with all h row signals h1', h2', h3'("hm1'") of the three secondary H data fields being applied to one inverse horizontal filter bank bh', as illustrated in FIG. 9d. The inverse horizontal filter bank bh' divides the total horizontal frequency range $f_H'$ of the secondary-image-reproducing device bs into m1=3 equal, adjoining subranges, with the lowest frequency subrange implemented with a low-pass filter. The output from the inverse horizontal filter bank bh' is a secondary row signal zi'. The data rate of this signal is higher than that of the applied h row signals h1', h2', h3' by the factor m1=3, since the inverse horizontal bank filter includes an interpolation filter and an oversampling stage with an oversampling factor of m1=3.

Figure 9E:
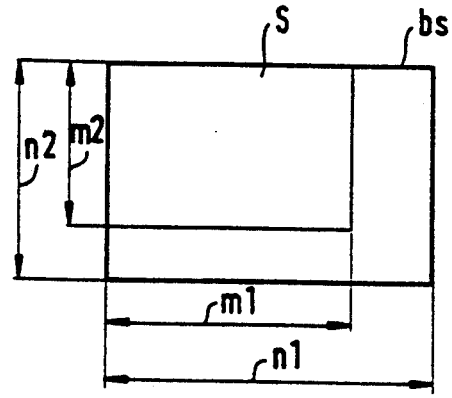

From the secondary row signal zi', the secondary image data field S can now be constructed row by row. Its data volume is reduced from that of the original primary image data field P in the horizontal and vertical directions by one quarter, as illustrated in FIG. 9e. If image reproduction takes place at the primary data rate, the secondary image data field S is read out in a shorter time, so that the secondary image has become smaller. If the secondary-image-reproducing device bs has a greater number of picture elements in the horizontal direction than the primary image, the secondary image will appear on the secondary-image-reproducing device reduced in size by the factors n1/m1 and n2/m2, since the frequency division in the m1 inverse vertical filter banks and in the single inverse horizontal filter bank is referred to the total frequency range $f_H'$ and $f_V'$ of the secondary-image-reproducing device.

A format conversion of a raster-scanned image is also required if the video signal is a television signal which is to be converted from one line standard to another, e.g., from the PAL standard with 625 lines per frame to the NTSC standard with 525 lines per frame. This basically means a reduction in the size of the image in the vertical direction, which is compensated in the NTSC line standard by using a greater line spacing, but the loss of vertical resolution cannot be avoided in this manner. The change of line standard corresponds to a change of the vertical scanning rate. This is the second dimension of the three-dimensional television signal.

A particularly simple format conversion according to the invention is possible during PAL/NTSC conversion if the primary matrix is formed from 36 HV data fields with n1=6 and n2=6 and transformed into a secondary matrix M' consisting of 30 HV data fields with m1=6 and m2=5. Of the 625 lines per frame, only the active lines are used for format conversion, of course. The individual filters in the inverse and non-inverse vertical filter banks can be easily implemented as digital filters if the respective frequency range can be referred to an integral number of lines. In the above-example, this is a frequency range which corresponds to 96 lines and gives 576 active lines in the PAL line standard and 480 active lines in the NTSC line standard, which nearly correspond to the actual active image region—in the primary image, some empty lines may have to be inserted or some marginal lines may have to be omitted.

In the future, the number of television standards will continue to increase as high-resolution line standards will be added. The method described permits conversion between the different television standards in an advantageous manner. The new television standards are based on a frame-line count of 1250, 1150 or 1050. According to the invention, compatibility with the hitherto used 625-line or 525-line standards can be established.

The primary matrix M, which is formed from the video signal according to the 1250-line standard, advantageously includes 144 HV data fields, with n1=12 and n2=12. From this primary matrix, a secondary matrix M' is formed according to the television-production or image-reproduction standard desired, with m1 and m2 having to be specified for the following reproduction standards as follows (m2 has to be specified according to the horizontal resolution desired, the value in parenthesis is only a preferred example):

m1=6 (m2=6) for a PAL television standard with 625 lines per frame (corresponding to 576 active lines); or m1=5 (m2=5) for an NTSC television standard with 525 lines per frame (corresponding to 480 active lines); or m1=12 (m2=12) for a television standard with 1250 lines per frame (corresponding to 1152 active lines); or m1=11 (m2=11) for a television standard with 1150 lines per frame (corresponding to 1056 active lines); or mi=10 (m2=10) for a television standard with 1050 lines per frame (corresponding to 960 active lines); or m1=8 (m2=8) for a first graphic reproduction standard for computers with 768 active lines (e.g., "large format VGA"); or m1=5 (m2=5) for a second graphic reproduction standard for computers with 480 active lines (e.g., "small format VGA").

Figure 11:
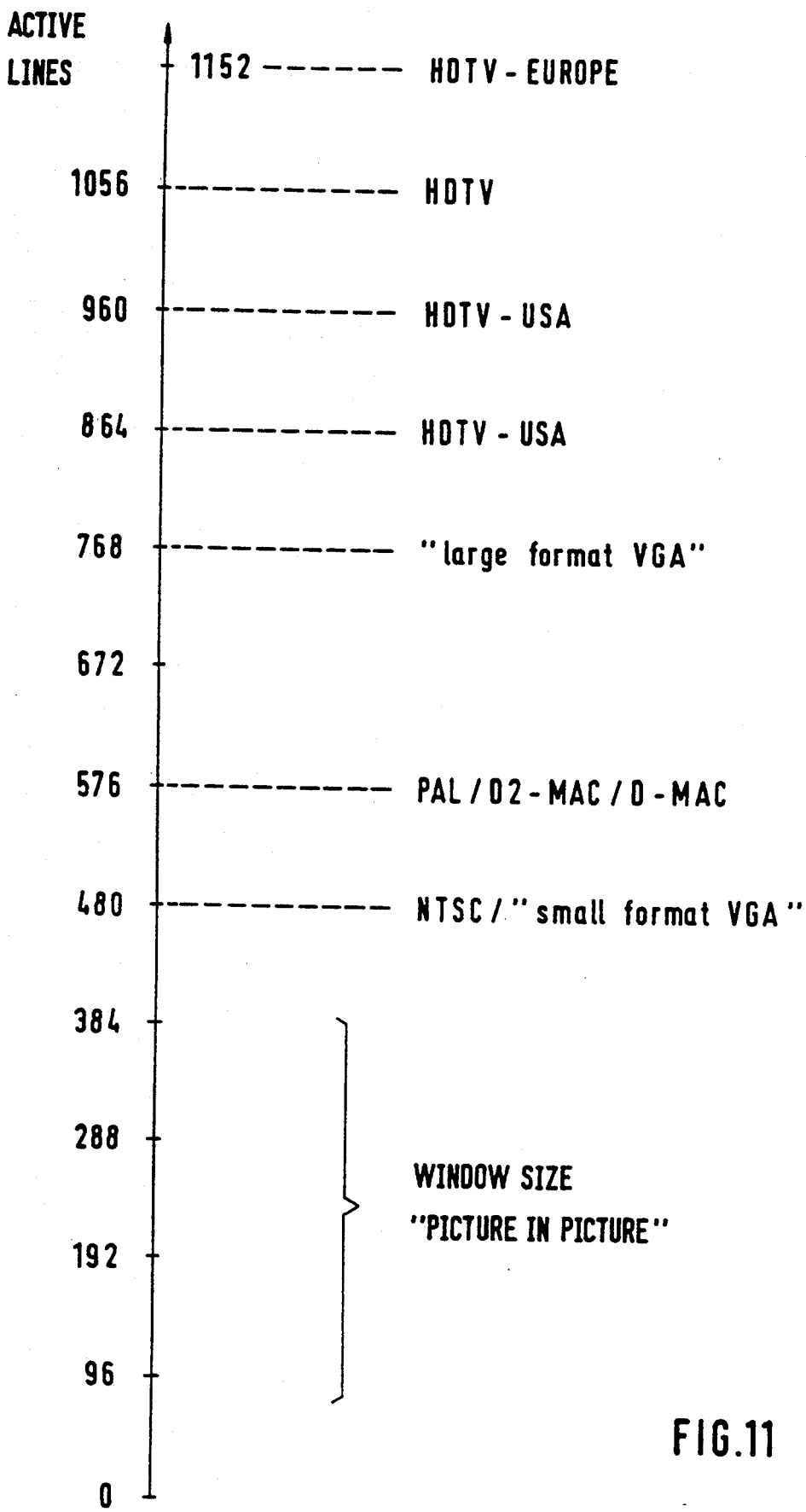
FIG. 11 shows the numbers of active picture lines of exemplary known reproduction standards in the form of a diagram.

Since the graphic reproduction standards relate to data-processing equipment with multicolor screens, it is possible that in future, television programs can also be viewed on high-resolution screens of data-processing equipment, possibly in a smaller size and possibly as "picture in picture" with a given window size on the screen, via suitable transforming devices. FIG. 11 shows the numbers of active lines of some conventional reproduction standards in a schematic chart.

Figure 10A:
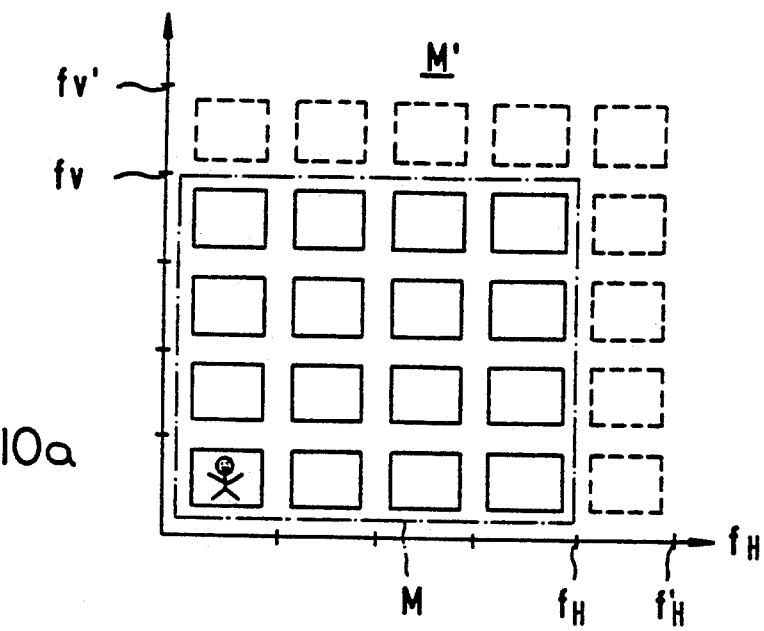
FIG. 10a to FIG. 10c shows schematically an example of how the format of an image is changed by means of an extrapolated primary matrix.
Figure 10B:
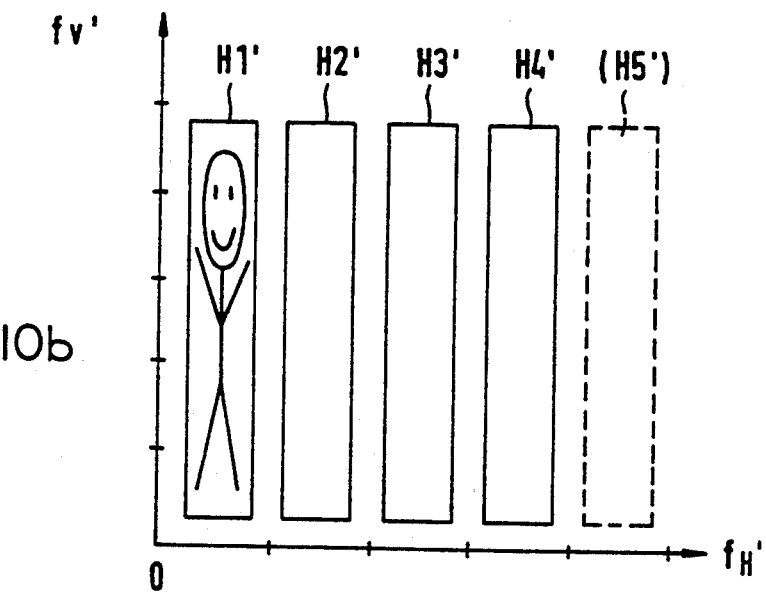
Figure 10C:
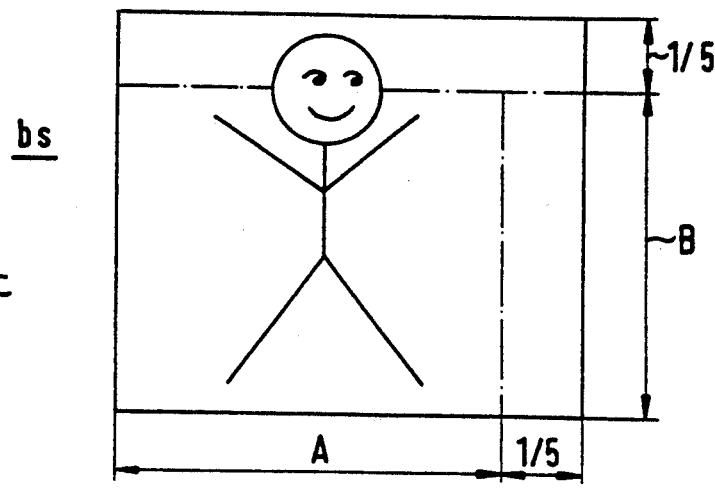

FIGS. 10a, 10b and 10c show with the aid of a simple data-field scheme the up-transformation or extrapolation of a television picture to a larger format. As shown in FIG. 10a, the primary matrix M includes only 16 HV data fields. The 9 HV data fields with high frequency components (dashed lines) are not present in the secondary matrix M' and must be replaced during synthesis by 9 pseudo-HV data fields. Therefore, in the first synthesis stage, the circuit belonging to FIGS. 10a-10c (not shown), only four first inverse filter banks are necessary. These combine the HV data fields of the primary matrix M having the same horizontal frequency range, which are arranged one above the other in the column direction, into four secondary H data fields H1' to H4' as shown in FIG. 10b. The first inverse filter banks divide the total vertical frequency range $f_V'$ of the secondary-image-reproducing device bs into five equal subranges of which only each of the four lowest-frequency subranges is fed with one primary subband signal. The outputs of these four first inverse filter banks feed the four lowest-frequency inputs of a second inverse filter bank which divides the total horizontal frequency range $f_H'$ of the secondary-image-reproducing device into five equal subranges. As shown in FIG. 10c, output from this second inverse filter bank is the desired signal, whose original format A, B was increased by a factor of 1/5 in the horizontal and vertical directions.

What is claimed is:

1. A method of altering the clock rate of a signal digitized at a first clock rate by a factor of m/n to a second clock rate, comprising the steps of:

transforming said digital signal into n primary subband signals in a first digital filter device during an analysis phase, each subband signal having a respective frequency range and a respective clock rate, said frequency ranges adjoining each other, said respective clock rates being lower than a first clock rate by said factor n;

feeding m secondary subband signals to a second filter device during a synthesis phase, said secondary subband signals having adjoining frequency ranges, said second filter device providing m modified subband signals as outputs at a clock rate increased in the second filter device by a factor m, wherein factor n and said factor are m different integers;

combining said m modified subband signals in a summing device during said synthesis phase to form an output signal having said second clock rate;

wherein:

said m secondary subband signals comprise at least one continuous subset of said primary subband signals arranged according to ascending frequencies, starting from the lowest frequency range of said respective frequency ranges; and if sufficient primary subband signals are not present, replacing missing primary subband signals by pseudosubband signals.

2. The method as defined in claim 1, wherein:

said first filter device comprises a first filter bank comprising n filters, each filter formed by a decimator comprising a decimation filter and a subsampling stage;

at least one of said decimation filters comprises a bandpass filter;

said second filter device comprises an inverse filter bank comprising m filters each formed by an interpolator comprising an interpolation filter and an oversampling stage; and at least one of said interpolation filters comprises a bandpass filter.

3. The method as defined in claim 2, wherein said interpolation filter in the lowest frequency range comprises a low-pass filter.

4. The method as defined in claim 2, wherein said decimation filter for the lowest frequency range comprises a low-pass filter;

5. A circuit arrangement for transmitting or storing a digitized audio signal, comprising:

an analysis device comprising a decimator that receives said digitized audio signal at a first clock rate and forms a first number n of subband signals whose clock rate is reduced by a factor having a value of said first number n;

a multichannel transmission device and a multi-channel storage device that receive at least one continuous subset of said n subband signals generated by said analysis device, said subset beginning with a lowest frequency range; and a synthesis device that forms a digital audio output signal from a second number m of subband signals that includes said subset, said synthesis device comprising an interpolator that increases the clock rate of said digital audio output signal by a factor m, wherein said first numbers and said number m are different integers.

6. A circuit arrangement as claimed in claim 5, wherein:

said multichannel transmission device and said multichannel storage device are occupied by a first number n of subband signals in the order of increasing transmission and storage quality, respectively; and when an erroneous signal section occurs in said subband signals, said erroneous signal section is replaced by one of: a repetition; a prediction; or an insertion of zero values.

7. A circuit arrangement for transmitting a digitized audio signal, comprising:

an analysis device comprising a decimator that receives said digitized audio signal at a first clock rate and forms a first number n of subband signals whose clock rate is reduced by a factor n;

a multichannel transmission device that receives at least one continuous subset of said n subband signals generated by said analysis device, said subset beginning with a lowest frequency range; and a synthesis device that forms a digital audio output signal from a second number m of subband signals that includes said subset, said synthesis device comprising an interpolator that increases the clock rate of said digital audio output signal by a factor m, wherein said factor n and said factor are different integers.

8. A circuit arrangement as claimed in claim 7, wherein:

said multichannel transmission device is occupied by a first number n of subband signals in the order of increasing transmission quality; and when an erroneous signal section occurs in said subband signals, said erroneous signal section is replaced by one of: a repetition; a prediction; or an insertion of zero values.

9. A circuit arrangement for storing a digitized audio signal, comprising:

an analysis device comprising a decimator that receives said digitized audio signal at a first clock rate and forms a first number n of subband signals whose clock rate is reduced by the factor n;

a multichannel storage device that receives at least one continuous subset of said first number n of subband signals generated by said analysis device, said subset beginning with a lowest frequency range; and a synthesis device that forms a digital audio output signal from a second number m of subband signals that includes said subset, said synthesis device comprising an interpolator that increases the clock rate of said digital audio output signal by a factor m, wherein said factor n and said factor m are different integers.

10. A circuit arrangement as claimed in claim 9, wherein:
said multichannel storage device is occupied by a first number n of subband signals in the order of increasing storage quality; and
when an erroneous signal section occurs in said subband signals, said erroneous signal section is replaced by one of: a repetition; a prediction; or an insertion of zero values.

11. A method of altering the clock rate of a multidimensional signal digitized at a first clock rate by at least one factor mi/ni corresponding to an associated dimension di, comprising the steps of:
transforming said multidimensional signal to P1 primary subband signals in a first multidimensional filter device during an analysis phase, said primary subband signals arrangable according to ascending frequencies in the form of a multidimensional array with respective dimensions di, the frequency ranges of said first multidimensional filter device adjoining each other in the direction of each dimension di;
reducing the clock rate of said primary subband signals by a factor P1 from said first clock rate by means of said first multidimensional filter device;
feeding P2 secondary subband signals to a second multidimensional filter device during a synthesis phase, said secondary subband signals having frequency ranges that adjoin each other in the respective dimensions di; and
forming a multidimensional output signal from said P2 secondary subband signals in said second multidimensional filter device and increasing said clock rate by a factor P2, wherein said factor n and said factor m are
wherein;
said P2 secondary subband signals comprise at least one continuous subset of said primary subband signals of said first filter device arranged according to ascending frequency ranges, starting from a lowest frequency range; and
when sufficient primary subband signals are not present, replacing missing primary subband signals with pseudosubband signals.

12. A method as claimed in claim 11, wherein:
said first multidimensional filter device comprises at least one filter bank for each dimension di, said filter bank comprising ni filters, each filter comprising a decimator, each decimator comprising a decimation filter and a subsampling stage, at least one of said decimation filters comprising a bandpass filter;
said second multidimensional filter device comprises at least one inverse filter bank for each dimension di, said inverse filter bank comprising mi filters, each filter comprising an interpolation filter and an oversampling stage, at least one of said interpolation filters comprising a bandpass filter; and
said filter bank and said inverse filter bank divide a total frequency range of the associated dimension di evenly.

13. The method as defined in claim 12, wherein said decimation filter for said lowest frequency range comprises a low-pass filter.

14. The method as defined in claim 12, wherein said interpolation filter for said lowest frequency range comprises a low-pass filter.

15. A circuit arrangement for changing the format of a raster-scanned image by clock-rate conversion wherein the video signal is digitized at a system clock rate, the format being changed by a factor m1/n1 in the horizontal direction and by a factor m2/n2 in the vertical direction, comprising the steps of:
decomposing a primary image data field by a single horizontal filter bank and n1 vertical filter banks into P1 data fields arranged according to ascending frequency ranges in a primary matrix;
dividing the respective total horizontal frequency range of said primary image data field into n1 adjoining, equal frequency subranges in said horizontal filter bank;
dividing the respective total vertical frequency range of said primary data field into n2 adjoining, equal frequency subranges in n1 vertical filter banks;
transforming at least one subset of said primary matrix into a secondary matrix with P2 data fields which comprise the data fields from 1 to m1 in the horizontal direction and from 1 to m2 in the vertical direction;
applying each column signal of the P2 HV data fields of the secondary matrix associated with the same horizontal frequency range 1 to m1 to one of m1 inverse vertical filter banks which divides the total vertical video-frequency range of a secondary-image-reproducing device into m2 adjoining, equal frequency subranges; and
arranging the output signals from said m1 inverse vertical filter banks, which form m1 secondary data fields, according to ascending frequency subranges;
wherein:
P1 and P2 are different integral values with P1 being equal to n1×n2 and with P2 being equal to m1×m2;
the signal processing in the m1 inverse vertical banks occurs at the horizontal rate of the secondary-image-reproducing device;
the row signals of the m1 secondary data fields are fed to a single inverse horizontal filter bank which divides the total horizontal video frequency range of the secondary-image-reproducing device into m1 adjoining, equal frequency subranges, the secondary data fields being assigned to the individual frequency subranges of the inverse horizontal filter bank according to ascending frequencies;
the output signal from the inverse horizontal filter bank forms a secondary image data field;
the signal processing in the inverse horizontal filter bank takes place at the horizontal data rate of the secondary-image-reproducing device; and
the secondary image data field is the entire data field of the secondary-image-reproducing device.

16. The circuit arrangement as claimed in claim 15, wherein for converting a television picture with a PAL line standard of 625 lines per frame to a television picture with an NTSC line standard of 525 lines per frame:
the primary matrix comprises P1=36 data fields with n1=6 and n2=6; and
the secondary matrix comprises P2=30 data fields with m1=6 and m2=5.

17. The circuit arrangement as defined in claim 15, wherein for format conversion factors m1/n1 and/or m2/n2 greater than unity and when signals from the data fields are not present, the m1 inverse vertical filter banks and the inverse horizontal filter bank are fed with zero data signals instead of being supplied with signals from the data fields m1, n2, m2 and n2.

18. The circuit arrangement as defined in claim 15, wherein:

said primary matrix is formed from the video data of a television picture with a line standard of 1250 lines per frame and comprises 144 data fields, with $n1=12$ and $n2=12$; and said primary matrix is transformed into a secondary matrix, with m1 being a selected one of the following for specified reproduction standards:

$m1=6$ for a PAL television standard with 625 lines per frame;

$m1=5$ for an NTSC television standard with 525 lines per frame;

$m1=12$ for a television standard with 1250 lines per frame;

$m1=11$ for a television standard with 1150 lines per frame;

$m1=10$ for a television standard with 1050 lines per frame;

$m1=8$ for a first graphic reproduction standard with 768 active lines; and $m1=5$ for a second graphic reproduction standard with 480 active lines.

* * * * *